No. 608,582. Patented Aug. 9, 1898.
L. C. CROWELL.
CUTTING AND DELIVERY MECHANISM.
(Application filed Mar. 22, 1895.)

(No Model.) 7 Sheets—Sheet 1.

Fig. 1.

No. 608,582. Patented Aug. 9, 1898.
L. C. CROWELL.
CUTTING AND DELIVERY MECHANISM.
(Application filed Mar. 22, 1895.)

(No Model.) 7 Sheets—Sheet 2.

No. 608,582. Patented Aug. 9, 1898.
L. C. CROWELL.
CUTTING AND DELIVERY MECHANISM.
(Application filed Mar. 22, 1895.)

(No Model.) 7 Sheets—Sheet 3.

No. 608,582. Patented Aug. 9, 1898.
L. C. CROWELL.
CUTTING AND DELIVERY MECHANISM.
(Application filed Mar. 22, 1895.)
(No Model.) 7 Sheets—Sheet 5.

No. 608,582. Patented Aug. 9, 1898.
L. C. CROWELL.
CUTTING AND DELIVERY MECHANISM.
(Application filed Mar. 22, 1895.)

(No Model.) 7 Sheets—Sheet 6.

UNITED STATES PATENT OFFICE.

LUTHER C. CROWELL, OF NEW YORK, N. Y., ASSIGNOR TO ROBERT HOE, THEODORE H. MEAD, AND CHARLES W. CARPENTER, OF SAME PLACE.

CUTTING AND DELIVERY MECHANISM.

SPECIFICATION forming part of Letters Patent No. 608,582, dated August 9, 1898.

Application filed March 22, 1895. Serial No. 542,740. (No model.)

*To all whom it may concern:*

Be it known that I, LUTHER C. CROWELL, a citizen of the United States, residing at New York, (Brooklyn,) county of Kings, and State of New York, have invented certain new and useful Improvements in Cutting and Delivering Mechanism, fully described and represented in the following specification and the accompanying drawings, forming a part of the same.

This invention relates to a delivery mechanism for web-printing machines, the object being to sever a web transversely into sheets and to deliver the same without defacing their ends by puncturing the same and to collect a number of such sheets or deliver the same singly, the sheets in either case being folded transversely, if desired, said operations being performed continuously or without separating one sheet from another to provide a working space between sheet and sheet at or near the point of severance from the web.

Heretofore both grippers and pins have been made use of in connection with a cutting mechanism for the purpose of holding and carrying onward the free or leading end of the web as such is repeatedly produced in dividing the web into sections or sheets by severing it transversely at distances equal to a sheet's length, the operation of the grippers or pins being to engage the leading end of the web and thus carry the web and each sheet so formed onward for delivery or collection or folding.

The presence of pin-holes in sheets intended for bookwork is objectionable because in producing perfect work they must be trimmed out, and this entails a waste of paper and resulting loss more or less great, according to the quality of paper used. To avoid this defect and its resulting expense in the production of sheets for bookwork in web-machines, grippers as the means for retaining the leading edges of the sheets have been resorted to because they do not puncture; but the use of grippers as sheet forwarding or carrying devices requires other mechanical devices in the manipulation of single sheets, and especially where many sheets are to be collected into a pack, which interferes with their rapid delivery.

The present invention not only avoids, as will be seen, injury to the sheets, such as that caused by the use of pins as forwarding devices, but enables successive sheet lengths to be continuously manipulated without separation.

The mechanisms here shown as embodying the improvements consist of oppositely-arranged jaws supported by a pair of rotating carriers and an associated cutting mechanism whereby the web may be severed into successive sheet lengths without separating one sheet length from another, the leading edges of which sheets are either seized for single delivery one after another or successive sheets are laid one upon another and delivered into a pack of associated sheets.

The various improvements herein embodied will be best understood from a description of the structure and operation of the mechanisms, and finally will be specifically pointed out in the claims.

A practical embodiment of the said improvements is found in the mechanisms illustrated by the drawings hereunto attached, in which—.

The two rotating carriers A B are geared together outside the frame by wheels 42 and 45, so as to run in unison and support the mechanisms for controlling the leading ends of the sheet portions, which are the lengths that are to be successively severed from the web and which hereinafter will be alluded to as "sheets." The material to be operated upon, as a web of paper P, is received from a printing-machine or other source of supply, being shown as led over a roller 30, passed through rollers 50 51 and thence between the carriers A B. This material or paper, as will be readily understood, may be a single web or consist of a number of webs brought together or associated by any of the means common in this art, the web or webs being longitudinally folded, if desired, as will be well understood.

The carriers A B support the means for controlling the leading end or ends of the sheet or sheets, so that the same may be delivered without injury thereto either singly or collectively, and before explaining the construction and operation of the said means the gearing illustrated in the mechanism embodying these improvements will be explained.

Within the frame the carrier A is provided with a wheel 40, which drives the feed-rollers 50 51 through an intermediate 41, a pinion on the roller 50, and a companion pinion 43 on the roller 51. This wheel 40 also drives the folding-rollers 52 53 through companion pinions, one only, 74, of which is shown.

At the gear side of the machine the carriers A B are respectively provided with a cam C and a cam-guard X, which are fixed to the side frames by suitable arms. (Shown in section in Fig. 5.) The cam C has a high part 75 extending throughout slightly more than half of its peripheral extent and a low part 76 the rest of the distance, and the cam-guard X, which is concentric with the shaft of the carrier B throughout its greatest extent, has at an upper point a cam projection 70. (See Fig. 12.) The offices of this cam and cam-guard will hereinafter appear. The carrier A is also provided, within the cam C, with an eccentric S, mounted upon its shaft 44 by a sleeve which may be secured to said shaft by a set-screw, so as to move therewith, or be disengaged, so as to remain stationary. This eccentric S when in action vibrates a lever having branching cam-arms 26 27, which respectively move in recesses in the cam C and cam-guard X, motion being imparted to them through an arm 25, having a stud or bowl embraced by said eccentric. When the cam-arm 27 of this lever is protruded within the cam-guard X, as in Fig. 5, it is opposed to and operates the tucking and nipping mechanisms of the carrier B, and when the cam-arm 26 is protruded within the cam C of the carrier A as in Fig. 3, it is opposed to and operates the nipping mechanisms of the carrier A, or protrudes the tucking-blade 8 to its greatest extent, as will hereinafter appear, and as these rocking cam-levers require to be in the position shown in Fig. 5 when sheets are not being collected, but, on the contrary, are being delivered in succession, so that the cam-arm 27 projecting within the cam-guard X will render that device a constant cam, causing the tucking and nipping devices of carrier B to operate at each revolution of said carrier, and the cam-arm 26 will be held out of operative position, so that the high part 75 and the low part 76 of the cam C will constantly operate to cause each set of nipping and tucking devices of that cylinder to move in coöperation with those of the carrier B for carrying each sheet length onward and at the proper point opposite to release said sheet to the folding-rollers 52 53. To set the lever-arms 26 27 in this position, it is necessary to put the eccentric S out of operation, and this is done by loosening its holding set-screw and keeping it fixed, when in the position shown in Fig. 5, by means of its socket, in which a sliding pin 31 is engaged and held by the thumb-screw 33. (See Fig. 6.)

Interiorly the cam-guard C is provided with a high part 75 and a low part 76 for operating the nipping-jaws 9 for coöperation with the tucking devices of the carrier B while passing the same and at an opposite point thereto for releasing the sheets, as will yet appear.

The carrier A is twice the size of the carrier B, and hence is provided with a double set of mechanisms for controlling the sheet. While the carriers might be of the same size and the parts be arranged to coöperate, it is preferable that the carrier A should be twice the size of the carrier B in some embodiments of the improvements, as in the present case, for the reason that here the carrier A, in addition to its other functions, is made to support folding-blades 34 35, that coöperate with the folding-rollers 52 53 in doubling or folding the sheets as a convenient method of finally delivering them. These folding-blades are well known as double rotating folding-blades, constructed and operating substantially as is set forth in Patent No. 171,196, of December 14, 1875, and therefore need no special description here except to say that the stationary cam 90 herein shown aids in accomplishing the semirotation of the blades by acting upon their rock-arms.

The carriers A B are provided with means for severing webs or long lengths of material into sheets which are of a length equal to the circumferential extent of the carrier B and of half the circumferential extent of the carrier A.

By reference to Figs. 4 and 7 to 11, the cutting mechanism will be more readily understood. The cutting devices consist of a cutting-blade 2, extending radially from and supported by the carrier B, and of cutting slots or spaces 4, provided in the carrier A at opposite points thereof, said cutting mechanism operating to completely sever the material transversely. The cutting-blade 2 is fixedly attached in the carrier B, it may be to a holding-block 10, which is supported in a groove in the carrier B and secured in position by suitable bolts. The block 10 is furthermore provided in advance of the blade 2 with a spring-seated lip 15, as in Fig. 4, the limit of whose forward movement is determined by the stop 36, which protrudes through a recess in said spring-seated lip 15. The carrier A is provided with a companion box 100, which provides the cutting-recess 4, and also an opposing lip 16, between which lips 15 16 the material is momentarily nipped as it passes between the said carriers by the pinching action of the nipping-lip 15. These nipping-lips thus seize and hold the paper firmly as the knife is forced through it in the cutting operation.

Figure 4:
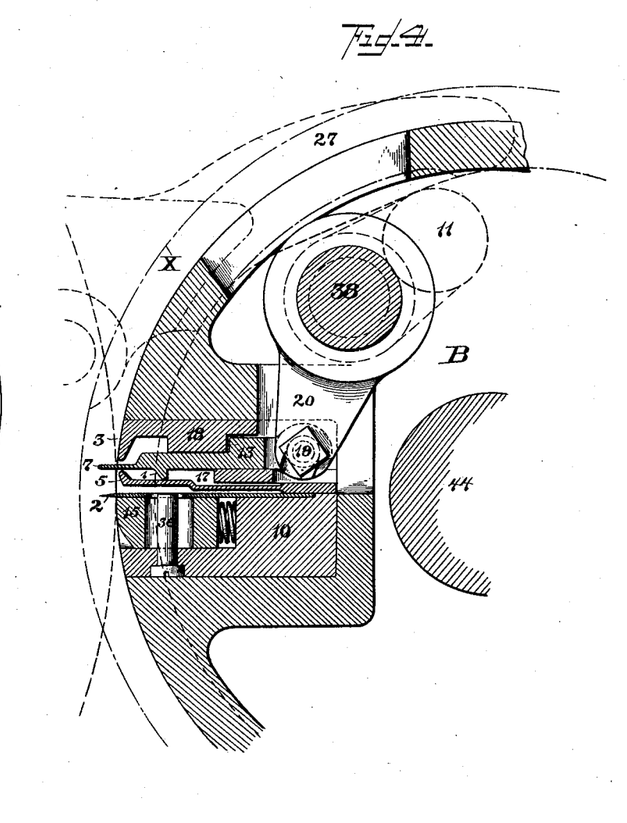
Fig. 4 is an enlarged partial sectional elevation of the carrier B as seen looking in the direction of the arrow 4 in Fig. 2.

Adjacent to its cutting-blade 2 the carrier or cylinder B is provided with nipping-jaws constituted by a fixed member 3 and a movable member 5, and the carrier A is likewise provided with nipping-jaws consisting of a fixed member 6 and a movable member 9. The movable members 5 and 9 are preferably long plates of spring metal subdivided, if desired, and attached by their heels to the body of the carriers A B, respectively. Between each spring-jaw and its companion fixed jaw are arranged sliding tucking-blades 7 8, which blades at the proper times are reciprocated to act upon the material, as will be hereinafter explained. This reciprocating motion is imparted to them by the following means: The tucking-blade 7 in the carrier B is a typical construction of all of the tucking-blades and consists, as is shown in Fig. 4, of a narrow extremity or tucking-blade proper projecting from a shank heavy enough to form its reciprocating support, which shank is enlarged near its rear to form a stop 13 and has its body shaped to be guided between the bearer 18 on the fixed jaw 3 and a bearer 17 opposite thereto. The shank of this tucking-blade is attached at a suitable number of points by pivots 19 to rock-arms 20, that project from a shaft 38, suitably journaled in the carrier B, and provided at one end with a rock-arm 11, the bowl or stud of which travels against the inner surface of the cam-guard X and its slight enlargement 70, except when a lever-arm 27 is opposed to it, being constantly pressed in that direction by means of a spring-pressed rod 47, attached to the arm 11.

As here shown, the tucking-blade 7 has its shank provided with a lug 1, adapted for engagement with an offset or shoulder upon the movable or spring jaw 5 of the associated nipping-jaws. From this construction it will be apparent, with the parts arranged for coöperation, as in Fig. 12, that as the carrier B revolves the tucking-blade 7 will be withdrawn to its greatest extent and be held in its inward position rearward of the nipping-jaws, as in Fig. 9, while the rock-arm 11 travels in contact with the inner surface of cam-guard X. This for the most part is concentric with the shaft of the carrier B, but has a high part 70 of short length, (see Fig. 12,) contact of the arm 11 with which projects the tucking-blade to its intermediate position, as in Fig. 8, while when the cam lever-arm 27 is protruded into said cam-guard, as in Fig. 5, contact of the arm 11 therewith will, through the rocking of the shaft 38 and the rock-arms 20, project the said tucking-blade to its greatest extent of protrusion or into its outward position, as in Fig. 10.

Figure 1:
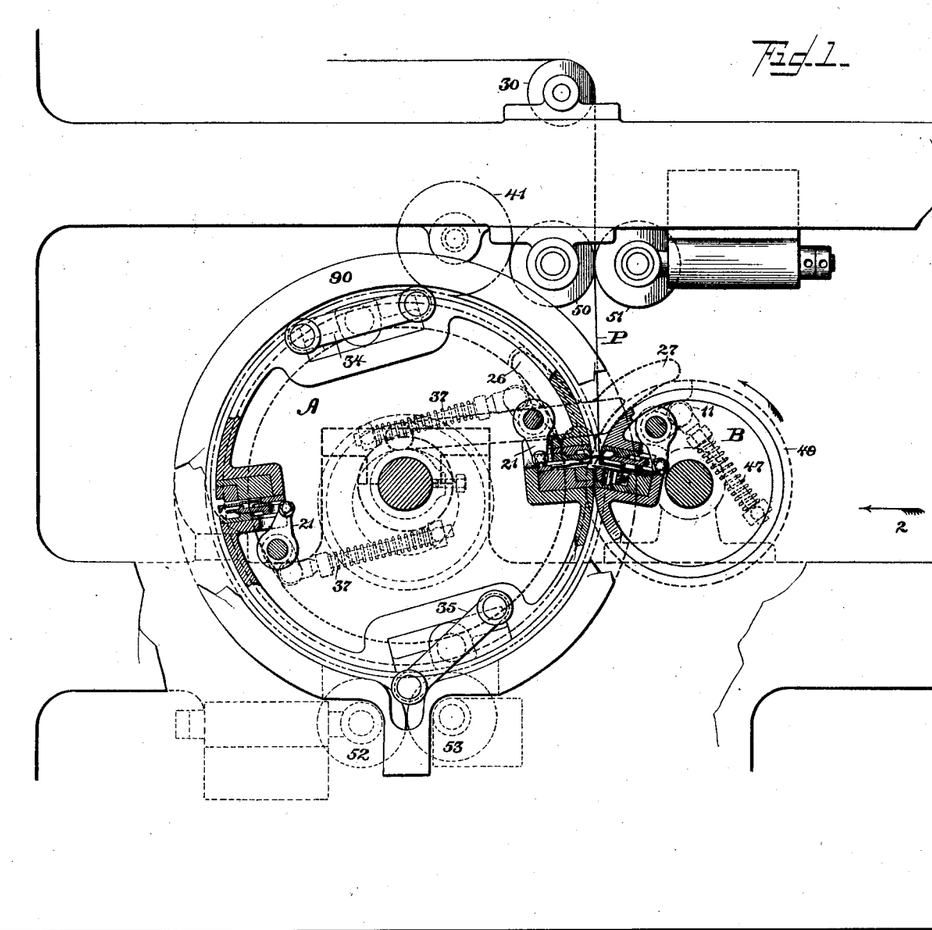
Figure 1 illustrates by an end elevation so much of the delivery apparatus of a web-printing mechanism as is necessary to an understanding of the same.
Figure 2:
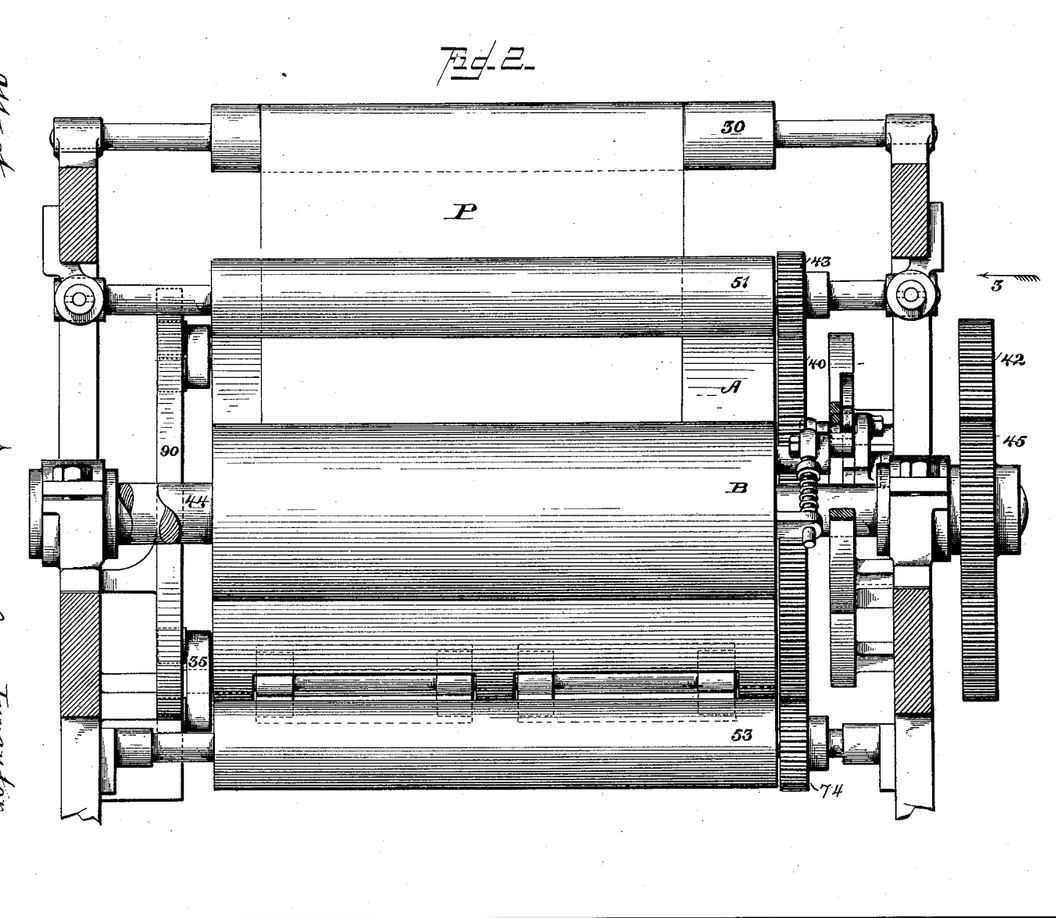
Fig. 2 is a side elevation of the same as seen looking in the direction of the arrow 2 in Fig. 1. In this view the web operated upon is omitted in part for perspicuity.
Figure 3:
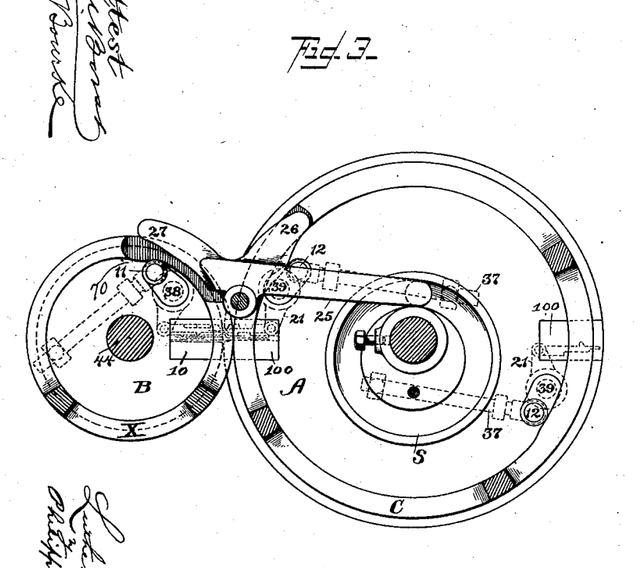
Fig. 3 is a sectional end elevation of the same, taken just within the framework and as seen looking in the direction of the arrow 3 in Fig. 2, the mechanisms being arranged to collect sheets.

Each tucking-blade 8, of which there are two at opposite points in the carrier A, has its shank provided with a lug $o$, adapted for engagement with an offset or shoulder upon the movable or spring jaws 9 of the associated spring-jaws, and said blades are similarly constructed and operated with respect to their nipping-jaws 6 9, as is indicated by the rock-arms 21, by which they are connected to their shafts 39 and the rock-arms 12. These arms 12 are held in operative contact with the cam C by means of spring-holding rods 37, which force the rock-arms 12 outwardly or against the cam-faces. These tucking-blades 8 are principally reciprocated by the high and low parts 75 76 of the cam C, being moved outward to their intermediate position—that is, just behind the nipping-jaws 6 9, as in Fig. 10—while the high part 75 of the cam is traversed by the rock-arms 12 and being withdrawn to their inward position, as in Fig. 11—that is, behind the nipping-jaws 6 9—while the low part 76 of the cam C is so traversed. To cause the greater outward movement of these tucking-blades 8, as in Fig. 9, there is provided a cam-lever, one arm 26 of which is vibrated so that at times it will protrude within the cam C and present its cam-face for action against the arms 12, as is seen in Fig. 3, or to carry said cam-face of the lever out of action, as is seen in Fig. 5.

The operative positions of the cam lever-arms 26 27, which lever is at times vibrated by the eccentric S, and the consequent movements of the tucking-blades 8, as well as the movements of the tucking-blade 7, depend upon the eccentric S, which may remain stationary or be secured to and move with shaft 44, as will appear in the following description of the operation.

Figure 5:
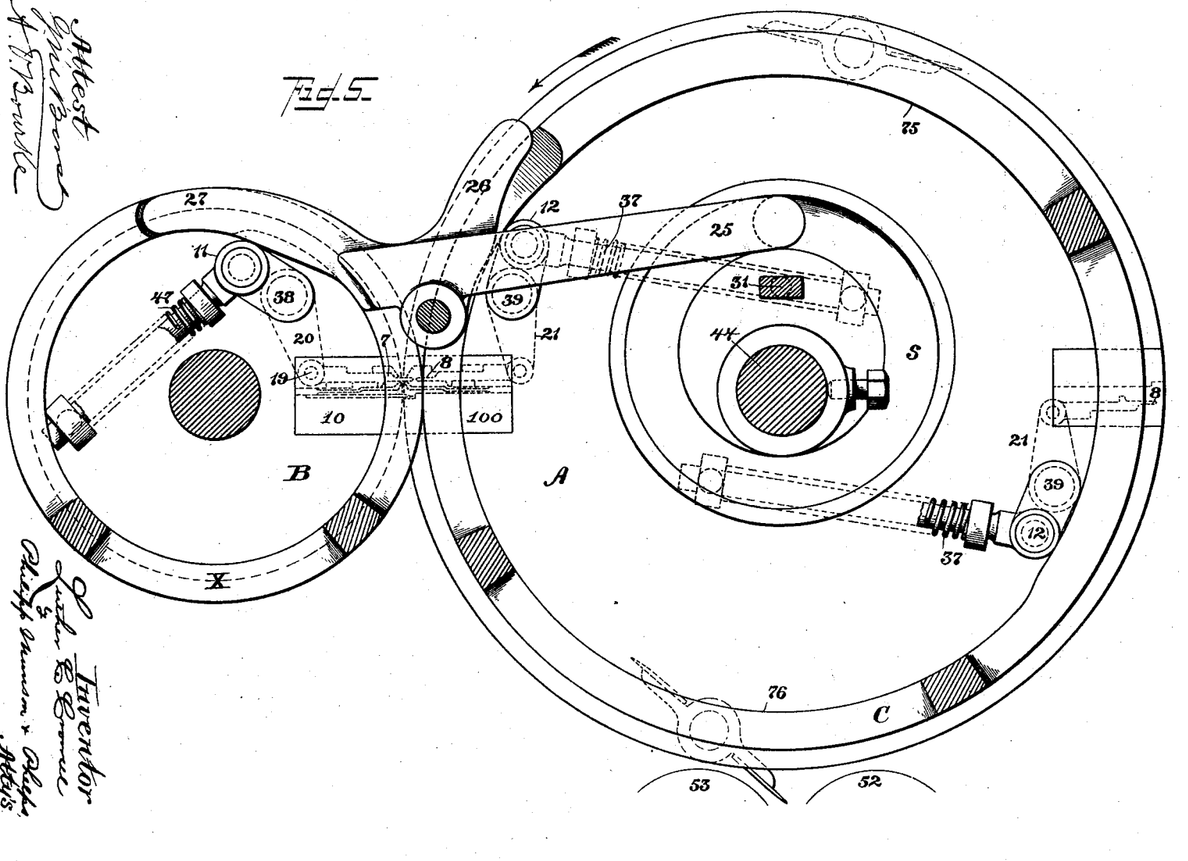
Fig. 5 is an enlarged end elevation of the carriers A B, similar to Fig. 3, but with the parts arranged so as to deliver successive sheets.
Figure 6:
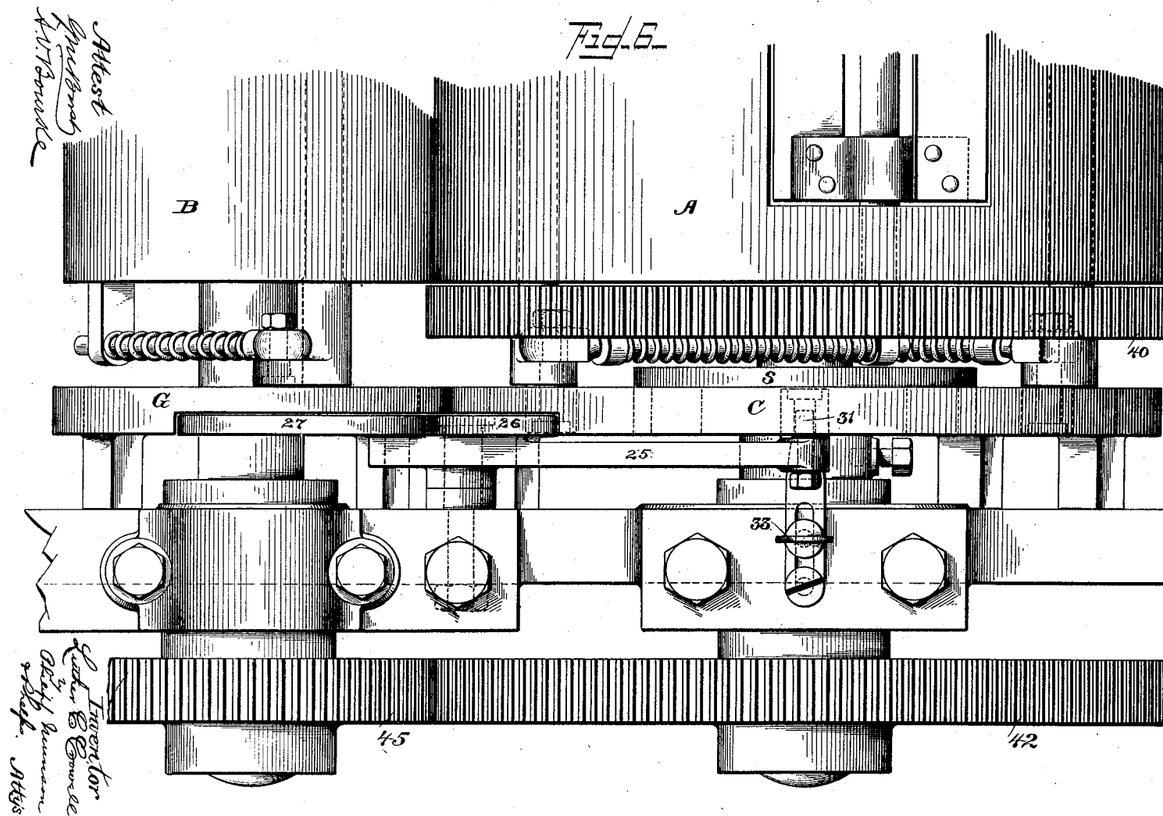
Fig. 6 is an enlarged partial plan view of the mechanisms near the gear end.

In order to collect or associate two succeeding sheets severed from the web, the mechanisms will be as is illustrated in all the figures except Figs. 5 and 6—that is, the eccentric S will be in action to oscillate the lever cam-arms 26 27.

As the carriers A B revolve the cutting, tucking, and nipping mechanisms are brought into coöperation as they approach and pass their coacting point, which is where the carriers A B run nearest in contact. During about one-half of a revolution of the carrier A, or while the rock-arms 12 are traversing the low part 76 of the cam C, the tucking-blades 8 are held in their inward position rearward of the nipping-jaws 6 9, as is shown in Fig. 11, while during the time said arms 12 traverse the high part 75 of the cam C said blades 8 are moved to and held in the intermediate position shown in Fig. 10, which movement causes the leg $o$ to open the jaws 6 9, their further movement to their outward position, as shown in Fig. 9, and return to their inward position (shown in Fig. 11) being quickly effected by their rock-arms 12 while they are traversing the cam-face of the lever 26, as in Fig. 3, and passing thence to the low part 76 of the cam C, their intermediate position being again attained, as in Fig. 10, when their rock-arms 12 again mount and travel in contact with the high part 75 of cam C, as in Fig. 5.

Figure 7:
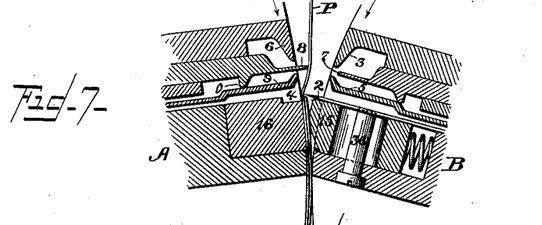
Figs. 7, 8, 9, 10, and 11 are enlarged sectional details of portions of the carriers supporting the cutting, tucking, and nipping mechanisms, showing the same in various positions of their operation.
Figure 8:
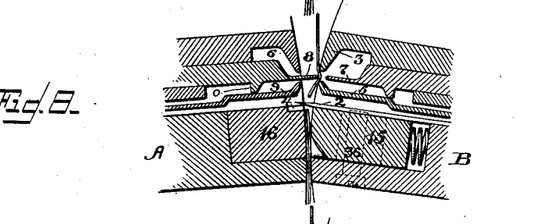
Figure 9:
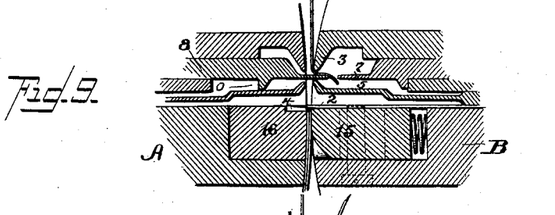

During the greater part of a revolution of the carrier B, or while the rock-arm 11 is traversing the inner periphery of the cam-guard X and during nearly a complete revolution, if the cam-lever 27 is out of operative position, as in Fig. 3, the tucking-blade 7 is held in its inward position, rearward of the nipping-jaws 3 5, as shown in Figs. 3 and 9, its protrusion to its intermediate position, as in Fig. 7, which movement of it causes its lug 1 to open the jaws 3 5, being quickly effected by its rock-arm 11 traversing the short high part 70 of cam-guard X. Its further movement or greater protrusion to its outward position, as in Fig. 10, and return to its inward position, as in Fig. 9, is effected by the rock-arm 11 in traversing the cam-face of the lever 27, adjusted as in Fig. 5.

The web of material P, being fed onward between the carriers A B, will be pressed by the spring-seated block 15 as it is brought into its active relation with the cushion-block 16, which may be rubber, as in Fig. 7, and thus be temporarily nipped and supported as the cutting-blade 2 is forced through it and into the cutting-slot 4 to sever the web transversely and detach a sheet's length therefrom.

Figure 10:
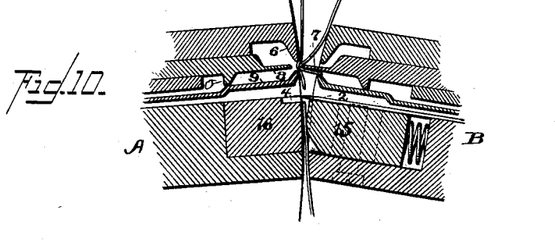
Figure 11:
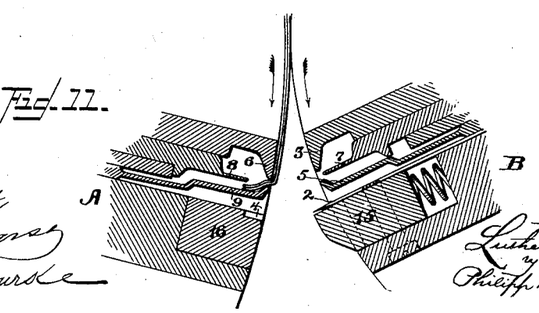

As the cutting-blade 2 is closely approaching its operative point, the cam-lever arm 26 having been swung into its operative position (shown in Fig. 3) by the eccentric S, which has rocked its operative arm 25 into its innermost position, as in Fig. 3, the rock-arm 12 will pass over the high cam-surface presented by the lever-arm 26 and cause the tucking-blade 8, then standing, as in Fig. 10, in its position of intermediate protrusion, to quickly move outward to its position of greatest protrusion, (see Figs. 7, 8, and 9,) the rock-arm 11 simultaneously contacting with the cam enlargement 70 to move the blade 7 to its intermediate position, and thus cause the lug 1 to open the jaws 5, during which movement the tucking-blade 8 will have carried the leading end of the web (produced by its severance) with it and tucked the same between the spring nipping-jaws 3 5, said blade 7 retreating as blade 8 advances, the blade 7 releasing the said jaws, so that they nip the said web-end between them as they close, and the blade 8 being subsequently stripped from the web and jaws as it retreats to its inward position. The result of these movements is that the web is simultaneously severed transversely and its detached end is controlled by the nipping-jaws 3 5 of the carrier B, so that it thereafter moves around with that carrier, and after a revolution of the carrier B the leading end of the sheet is again brought between the carriers A B for association with a succeeding sheet's length of the web. The carrier A will meanwhile have made a half-revolution to bring its companion set of cutting, tucking, and nipping devices into coöperation with the like devices of carrier B. During these rotative movements of the carriers A B the cam-lever 25 will have been moved by the eccentric S so as to present the cam-face of its arm 27 in position for action upon the rock-arm 11 and so that the cam-face of its arm 26 will stand in its inoperative position or so that it will not be engaged by the rock-arm 12, as in Fig. 5.

Figure 12:
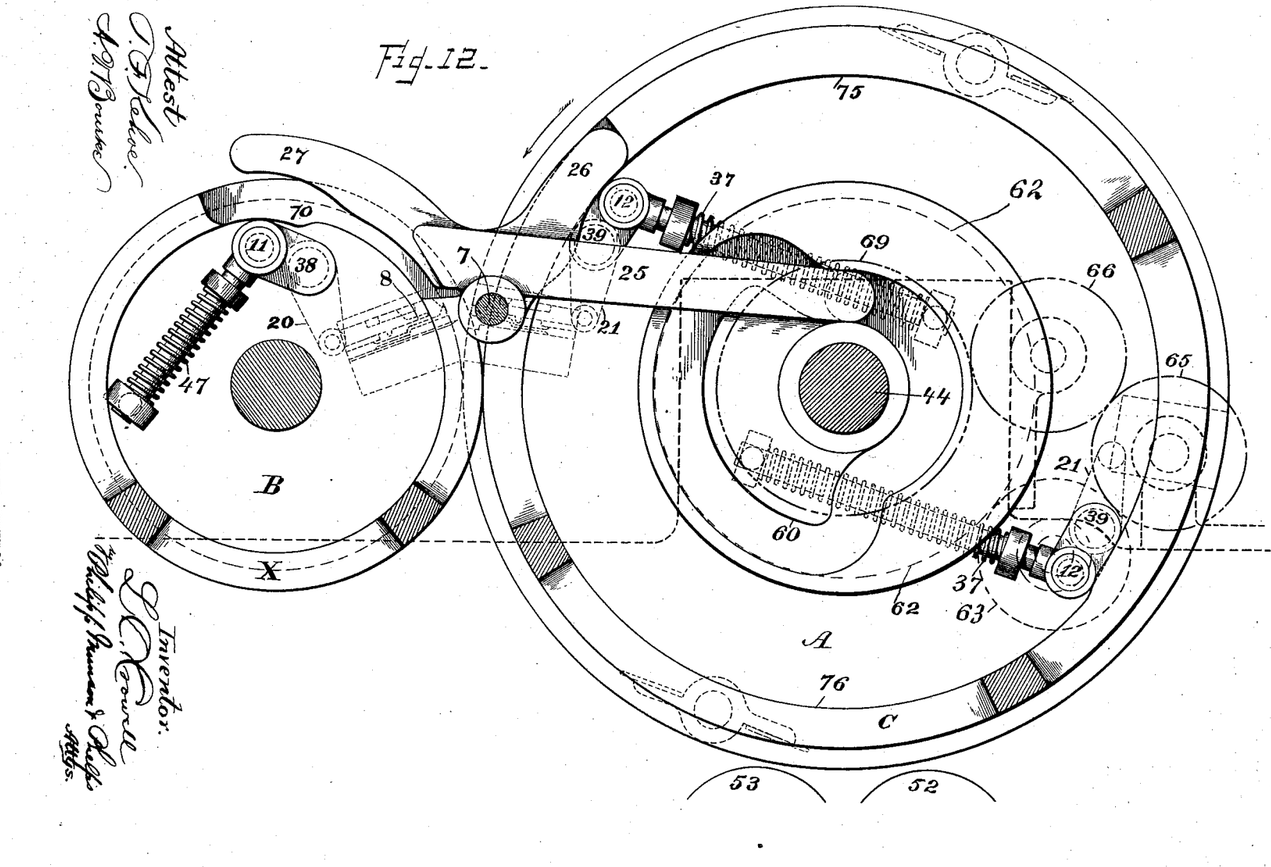
Fig. 12 is an enlarged end elevation of the carriers A B, the carrier A being modified to include mechanism for accumulating three sheets upon the carrier B.

As the cutting-blade 2 is again closely approaching its operative point the rock-arm 11 of the carrier B will engage the cam-surface of the lever-arm 27 and cause the tucking-blade 7 to quickly move outward to its position of greatest protrusion, as in Fig. 10, during which movement of this tucking-blade 7 it will have carried the severed end of the web and the leading end of the preceding sheet with it, thus tucking said ends, now lapped together, between the spring nipping-jaws 6 9, and as quickly retreating leave said ends nipped between said jaws, as in Fig. 11, the tucking-blade 8 having just in advance or about simultaneously with the protrusion of blade 7 been moved to its intermediate position of protrusion as its rock-arm passed from the low part 76 to the high part 75 of the cam C, during which movement its lug $o$ opened the jaws 6 9 to receive the paper carried between them by the blade 7. After passing over the high parts of the cams the blades 7 8 simultaneously retreat, thus causing the nipping-jaw 9 to bear the paper into the embrace of itself and coacting jaw 6, while the blade 7 strips itself therefrom, thus leaving the ends of two sheets nipped by the jaws 6 9, as in Fig. 11, which carry them onward for delivery. The results of these movements are that the web is simultaneously again severed transversely, its detached forward end has associated with it the leading end of the preceding sheet, the two ends are controlled by the nipping-jaws 6 9 of the carrier A, and the sheets thus lapped together or associated thereafter move onward around said carrier A, from which they may be delivered in any approved way. Sheet after sheet will thus be laid one upon another on the carrier B so long as the lever-arms 26 27 remain in the positions shown in Fig. 3. Thus three or any number may be collected upon the carrier B and discharged *en masse* therefrom whenever the lever-arms 26 27 are brought into the position shown in Fig. 5, when, as we have seen, the leading ends of the said sheets will be delivered into the embrace of the jaws of the carrier A for simultaneous delivery. This collecting or associating of successive sheets for simultaneous delivery may by slight modification of the devices be extended to include any desired number of sheets. Thus if the eccentric S has substituted for it a suitably-shaped cam, as 60, and the same is so shaped and moved as to throw the cam-arms 26 27 from their position shown in Fig. 12 to that position shown in Fig. 5 at, say, every third, fourth, and so on revolution of the carrier B, the sheets held in the embrace of the jaws 3 5 will be retained there and successive sheets added thereto by the operation of the tucking-blade 8, which sheets will thus be carried around upon the carrier B until their number, whatever it may be, is discharged from said jaws when the cam-arms 26 27 are in the position of Fig. 5 and be delivered to the jaws 4 6 of the carrier A, as just before explained. In Fig. 12 is shown a means illustrative of the said modification, the mechanisms being provided to cause the accumulation of three sheets upon the carrier B. This consists of a box-cam 60, suitably mounted to turn upon the shaft 44 of carrier A in the place of the eccentric S, said cam having a toothed periphery constituting a wheel 62, by which said cam is revolved. To suitably revolve this cam 60, a wheel 69 is mounted fast upon said shaft 44, alongside the wheel 62, and these wheels 62 and 69 are geared together by an intermediate train composed of wheels 63 65 66, which are carried by the side frame and brackets therefrom, 63 meshing with the wheel 62, and 66 meshing with the wheel 69. By this arrangement the first and second sheets of a pack of three are carried around upon the carrier B and accumulated, while the third sheet is associated therewith and passed off for delivery as a component part of said pack of three. Other similar modifications may be made to increase the number of sheets composing each accumulated pack.

If it is desired to deliver single sheets, the eccentric S is locked stationary, as before described, by means of the locking-arm 31, whereupon the lever-arms 26 27 will be maintained in the positions shown in Fig. 5, so that only the cam C will affect the movement of the tucking-blade 8, this cam then causing the said blades at each rotation of the carrier A to be protruded as the rock-arms 12 travel over its high part 75 and be withdrawn as said arms 12 travel over its lower part 76; and the tucking-blade 7 will be protruded and withdrawn by the cam-face of the lever-arm 27 at each revolution of the carrier B. Now as the cutting, tucking, and nipping devices come into operation the blade 7 will move outward to engage and deliver the leading end of successive sheets into the nip of the jaws 6 9, which will nip and carry said sheets successively onward upon the periphery of the carrier A for delivery in any manner; but as it is desirable to deliver sheets, whether carried onward singly or consisting of two associated together, with at least one transverse fold, the said sheets, whether carried onward singly or collectively thereby, will have their leading ends released from the nipping-jaws 6 9 at the proper time, and the said sheets will preferably be folded or doubled by means of the one or the other of the double folding-blades 34 35 into the nip of the folding-rollers 52 53, their leading ends being drawn thereby out of the jaws 6 9, and as these sheets emerge from said rollers in a once-folded condition they may be conveyed to a piling device or be intermediately again folded, as may be desired, by any of the means common in this art.

The nipping-jaws herein shown and explained have been described as being opened by means of lugs upon the shanks of the tucking-blades. It is possible, especially where strong paper is operated upon, to open the spring-like nipping-jaws for the reception of the paper by means of the tucking-blades themselves forcibly entering between them; but in this case the tucking-blades should have such shape and the movable nipping-jaws be so constructed that the tucking-blades will readily enter between and cause the opening of said jaws, while the resiliency of the spring-jaws themselves will close and tend to hold the jaws closed.

It is preferred, however, that the spring-jaw shall be opened by a positive movement, and this is attained in the present instance by means of lugs on the tucking-blades, which coact in their forward movement by contact with suitable shoulders on the spring-jaws, contact of the two causing the spring-jaw to be opened and its resiliency to close it upon the retirement of the nipping-blades. It will thus be seen that when the rock-arms 12 are traversing the high part 75 of the cam C what has been called their "intermediate protusion" is sufficient to cause contact of the lugs on the tucking-blades with the shoulders on the spring-jaw and open the nipping-jaws. Thus the jaws of the carrier A will be opened at the point where they are to receive the end of the material independently of the tucking-blade to enter between them, and also at the opposite point where, they are to release the same when it is to be folded between the folding-rollers 52 53.

Instead of shaping the cams so as to withdraw the said tucking-blades or cause their retiring action, said blades might be spring-seated and the forward movement of one cause the retiring movement of the other.

While it is desirable, especially in the collecting or associating operation, to provide the sheets by cutting the web transversely by an associated cutting mechanism, the sheets may be previously cut and fed in succession to these devices.

So far as sheet-forming by severing the web and a mere delivery of each sheet is concerned, the tucking-blade 7 might be fixed in a protruded position; but in consequence of the further operation of directing sheets to cylinder B to be carried thereby it is required that this blade reciprocate in order not to obstruct that operation.

What I claim is—

1. In a delivery mechanism, the combination with a rotating carrier provided with one member of a cutting mechanism and nipping-jaws, of a companion rotating carrier provided with a member of the cutting mechanism and a tucking-blade coöperating with said jaws, said jaws and blade being respectively adjacent to the cutting mechanism, whereby a web of material is severed transversely and the severed end is seized and carried onward by said jaws for delivery, substantially as described.

2. In a delivery mechanism, the combination with a rotating carrier provided with one member of a cutting mechanism and nipping-jaws, and with a companion rotating carrier provided with a member of the cutting mechanism and a tucking-blade coöperating with said jaws, of means for reciprocating said blade whereby a web of material is severed transversely and the leading end of the web is seized and carried onward by said jaws for delivery, substantially as described.

3. In a delivery mechanism, the combination with a rotating carrier provided with one member of a cutting mechanism and nipping-jaws, and with a companion rotating carrier provided with a member of the cutting mechanism and a tucking-blade coöperating with said jaws, of means for reciprocating said blade and means for causing said jaws to nip the sheet, whereby a web of material is severed transversely and the leading end of the sheet is seized and carried onward by said jaws for delivery, substantially as described.

4. The combination with a rotating carrier provided with nipping-jaws, one member of a cutting mechanism, and a tucking-blade operating between said jaws, of a companion rotating carrier provided with a member of the cutting mechanism, nipping-jaws and a tucking-blade operating between them, the whole coöperating to sever a web of material transversely, cause the severed end to be seized by the jaws of the one carrier to be carried around thereby for association with the web, the tucking-blade of the last-named carrier operating on a repeated revolution of its carrier to deliver the ends of the associated material to the nipping-jaws of the companion carrier and the latter to carry the same onward for delivery, substantially as described.

5. The combination with a rotating carrier provided with nipping-jaws and a tucking-blade operating between said jaws, of a companion rotating carrier provided with nipping-jaws and a tucking-blade operating between them, whereby a sheet is retained by one carrier, and delivered with the succeeding sheet to the other carrier, and the pair are associated for delivery, substantially as described.

6. A mechanism for severing a web into sheets and seizing and carrying onward the leading end of such sheet, consisting of two carriers provided with cutting mechanisms and adjacent thereto a reciprocating blade movable in one carrier, and spring-jaws in the companion carrier whereby the end of the sheet is tucked into the embrace of said jaws to be carried onward thereby, substantially as described.

7. The combination with a rotating carrier provided with one member of a cutting mechanism and nipping-jaws, of a companion rotating carrier provided with a member of the cutting mechanism, and a tucking-blade coöperating with said jaws, the carrier provided with the jaws having associated with it folding devices whereby a web of material is severed transversely, its severed end is seized and carried onward by said jaws, and said sheet is folded transversely, substantially as described.

8. The combination with a rotating carrier provided with nipping-jaws, one member of a cutting mechanism and a tucking-blade operating between said jaws, of a companion rotating carrier provided with a member of the cutting mechanism, nipping-jaws and a tucking-blade operating between them, one of said carriers being also provided with folding mechanisms, the whole coöperating to sever a web of material transversely, cause the severed end to be seized by the jaws of one carrier and carried onward thereby for association with the web and the tucking-blade of the last-named carrier operating on the repeated revolution of its carrier to deliver the ends of the associated material to the nipping-jaws of the companion carrier, and the latter operating to fold the associated sheets transversely, substantially as described.

9. The combination with a rotating carrier provided with nipping-jaws and a tucking-blade operating between said jaws, of a companion rotating carrier provided with nipping-jaws and a tucking-blade operating between them, one of said carriers also being provided with folding devices whereby sheets successively fed to said carriers are associated in pairs and the pairs are folded transversely, substantially as described.

10. The combination with the carriers A, B, of the nipping-jaws 3, 5, interposed tucking-blade 7, nipping-jaws 6, 9, and interposed tucking-blade 8, substantially as described.

11. The combination with the carriers A, B, of opposed jaws 3, 5, and 6, 9, tucking-blades 7, 8, and means for operating said blades so as to deliver the material first to one pair of jaws and then to the other pair of jaws, substantially as described.

In testimony whereof I have hereunto set my hand in the presence of two subscribing witnesses.

LUTHER C. CROWELL.

Witnesses:
H. T. MUNSON,
S. WINTHAL.